(12) United States Patent
Sugawara et al.

(10) Patent No.: US 8,371,787 B2
(45) Date of Patent: Feb. 12, 2013

(54) SELF-TAPPING SCREW

(75) Inventors: Yukihiko Sugawara, Souka (JP); Masakazu Hayashi, Tokyo (JP)

(73) Assignees: Tokyo Byokane Co., Ltd., Tokyo (JP); Natec Co., Inc., Saitama (JP)

( * ) Notice: Subject to any disclaimer, the term of this patent is extended or adjusted under 35 U.S.C. 154(b) by 294 days.

(21) Appl. No.: 12/831,365

(22) Filed: Jul. 7, 2010

(65) Prior Publication Data

US 2011/0014006 A1    Jan. 20, 2011

(30) Foreign Application Priority Data

Jul. 16, 2009   (JP) ................................. 2009-167953

(51) Int. Cl.
*F16B 25/08*   (2006.01)
(52) U.S. Cl. ........................................ 411/386; 411/411
(58) Field of Classification Search .................. 411/386, 411/411
See application file for complete search history.

(56) References Cited

U.S. PATENT DOCUMENTS

| | | | | |
|---|---|---|---|---|
| 4,527,932 A | * | 7/1985 | Onasch et al. ................ | 411/411 |
| 5,061,135 A | * | 10/1991 | Pritchard ...................... | 411/411 |
| 5,088,869 A | * | 2/1992 | Greenslade ................... | 411/386 |
| 5,544,993 A | * | 8/1996 | Harle ............................. | 411/414 |
| 6,672,813 B1 | * | 1/2004 | Kajita et al. .................. | 411/411 |
| 2005/0244249 A1 | * | 11/2005 | Sussenbach .................. | 411/411 |
| 2009/0047095 A1 | * | 2/2009 | Pritchard ...................... | 411/411 |

FOREIGN PATENT DOCUMENTS

| | | |
|---|---|---|
| JP | 2004-162906 | 6/2004 |
| JP | 2007-107693 | 4/2007 |
| JP | 2007-315609 | 12/2007 |
| JP | 3140074 | 3/2008 |

* cited by examiner

*Primary Examiner* — Flemming Saether
(74) *Attorney, Agent, or Firm* — Wenderoth, Lind & Ponack, LLP.

(57) ABSTRACT

A self-tapping screw includes a screw shaft extended downward from a screw head, plural flights of constant-height external thread respectively having the same flight height formed at a part of the screw shaft extended right below the screw head, and plural flights of low-height external thread having flight height decreased gradually toward an end face of a shaft tip portion formed continuously with the constant-height external thread at the shaft tip portion of the screw shaft. A slight arc face is formed continuously at respective connecting parts of upper and lower flanks with upper and lower root faces of the low-height external thread, and the slight arc face is formed so as to extend at least along a connecting part of a lower flank and a lower root face of a constant-height external thread end flight continuing to the low-height external thread.

4 Claims, 4 Drawing Sheets

SELF-TAPPING SCREW

BACKGROUND OF THE INVENTION

1. Field of the Invention

The present invention relates to a self-tapping screw to perform fastening while tapping an internal thread at a pilot hole formed at a counterpart.

2. Description of the Related Art

Recently, in electronic devices, communication devices, office equipment and the like being widely spread in the market, a self-tapping screw capable of eliminating a process to previously tap an internal thread at a counterpart has been often used for attaching an attaching part such as a component to the counterpart made of synthetic resin or metal.

Such a self-tapping screw has been commonly desired to obtain large fastening force as tapping an internal thread in high accuracy while possibly minimized screwing torque when fastening an attaching part with a counterpart.

In a self-tapping screw disclosed in Japanese Utility-model 3140074, especially, in a self-tapping screw of claim 1 without limitation that clearance is formed between a screw shaft circumferential face (i.e., a root face) and a pilot hole inner circumferential face, an external thread is formed to be two-step-shaped constituted with a crest portion having an acute-angled rectangular shape in section and a thread enlarging body portion below the crest portion having bilateral guide leg portions (i.e., inclined planes) being divergent to be connected to the root face with an angle larger than the crest portion over the entire external thread from the tip of a screw shaft to a part right below a screw head.

However, with the self-tapping screw having the two-step-shaped external thread, there has been a problem that initial screwing torque during screwing into a pilot hole, that is, the torque when the first part of the two-step-shaped external thread taps a two-step-shaped internal thread at the inner circumferential face of the pilot hole, is increased.

In addition, with the self-tapping screw of the abovementioned configuration, material flow is not to smooth during rolling to respective flanks of the crest portion of the external thread and to respective guide leg portions of the thread enlarging body portion. Accordingly, there has been a problem that surface roughening and burrs occur at the root face, respective flanks of the crest portion of the external thread and respective guide leg portions of the thread enlarging body portion or that cracking occurs at the crest portion of the external thread.

SUMMARY OF THE INVENTION

The present invention provides a self-tapping screw capable of effectively solving the above problems with a self-tapping screw in the related art.

In brief, the self-tapping screw according to the present invention includes a screw shaft formed of a cylindrical shaft that extends downward from a screw head and has a diameter that is constant over its entire length, plural flights of constant-height external thread respectively having the same flight height formed at a part of a screw shaft extended right below the screw head, and plural flights of low-height external thread having flight height decreased gradually toward an end face of a shaft tip portion formed continuously with the constant-height external thread at the shaft tip portion of the screw shaft. Then, a slight arc face is formed continuously at respective connecting parts of upper and lower flanks with upper and lower root faces of the low-height external thread, and the slight arc face, having a curvature radius in a range from 0.2 to 0.6 mm, is formed so as to extend at least along a connecting part of a lower flank and a lower root face of a constant-height external thread end flight continuing to the low-height external thread. The slight arc face is not formed at a connecting part of an upper flank and an upper root face of the constant-height external thread end flight, and further, is not formed at respective connecting parts of upper and lower flanks with upper and lower root faces of the flights of the constant-height external thread other than the constant-height external thread end flight.

Preferably, the slight arc face formed at the low-height external thread and the constant-height external thread end flight has a curvature radius in a range from 0.2 to 0.6 mm.

In addition to the above structure, the constant-height external thread continuing to the low-height external thread has a bilaterally symmetric shape in section with thread angle in a range from 48 to 52 degrees.

Moreover, the screw shaft is a cylindrical shaft having a constant diameter over the entire length thereof; and the low-height external thread is formed at the shaft tip portion having the constant diameter.

According to the present invention, due to synergy between forming the low-height external thread having the height thereof gradually decreased and forming the slight arc faces at the low-height external thread and the constant height thread end flight, stress to the counterpart at an initial stage of screwing can be relieved and the internal thread can be formed smoothly. Accordingly, screwing torque at the initial stage can be reduced.

Due to slightly convexly curved faces formed by the slight arc faces of the low-height external thread and the constant-height external thread end flight, material movement can be smoothly performed to corners of the flanks and the root faces of the succeeding constant-height external thread, so that the internal thread can be formed in high accuracy. Accordingly, reliable engagement between the constant-height external thread and the internal thread can be obtained and large fastening force can be obtained.

Further, since it is possible to set breakdown torque (i.e., torque of breaking the internal thread) to be large and the initial screwing torque to be small, the screwing torque range can be widened. Accordingly, it is possible to ensure a common torque band against counterparts made of resin or metal, so that screwing operation can be stably performed against any material.

Furthermore, according to the present invention, surface roughening and cracking at an external thread crest portion, as occurs in the related art when rolling two-step-shaped external thread, can be effectively prevented.

DESCRIPTION OF THE EMBODIMENTS

The self-tapping screw according to the present invention includes a screw shaft extended downward from a screw head, plural flights of constant-height external thread respectively having the same flight height formed at a part of the screw shaft extended right below the screw head, and plural flights of low-height external thread having flight height decreased gradually toward an end face of a shaft tip portion formed continuously with the constant-height external thread at the shaft tip portion of the screw shaft. Then, a slight arc face is formed continuously at respective connecting parts of upper and lower flanks with upper and lower root faces of the low-height external thread, and the slight arc face is formed so as to extend at least along a connecting part of a lower flank and a lower root face of a constant-height external thread end flight continuing to the low-height external thread.

Figure 1:
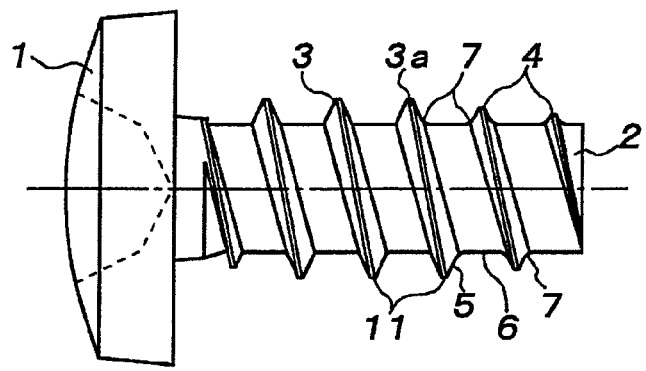
FIG. 1 is a side view which illustrates a self-tapping screw according to the present invention.

In the following, the present invention will be described in detail based on a preferred embodiment with reference to the drawings. As illustrated in FIG. 1, a self-tapping screw according to the present embodiment is basically configured to include a screw head 1 and a screw shaft 2 formed of a cylindrical shaft extended downward from the center of the lower face of the screw head 1, which is similar to a self-tapping screw in the related art. As illustrated also in FIG. 2, characteristic points are as follows. The screw shaft 2 is formed to have a constant diameter over the entire length thereof. Plural flights of constant-height external thread 3 respectively having the same flight height are formed at a part of the screw shaft 2 extended right below the screw head 1. Plural flights of low-height external thread 4 having the flight height decreased gradually toward an end face of a shaft tip portion are formed continuously with the constant-height external thread ridges 3 at the shaft tip portion of the screw shaft 2. A slight arc face 7 is formed continuously at respective connecting parts of upper and lower flanks 5 with upper and lower root faces 6 of the low-height external thread 4, and then, the slight arc face 7 is formed so as to extend along a connecting part of a lower flank 5 and a lower root face 6 at a constant-height external end flight 3a continuing to the low-height external thread 4.

Here, in the self-tapping screw according to the present embodiment, the angle α of gradual decrease in height of the low-height external thread 4 is to be set in a range from 6 to 12 degrees. The flanks 5 are formed to be straight faces in section and the root faces 6 are parallel to the axis of the screw shaft 2. The respective external threads 3, 4 are arranged at a predetermined pitch via the parallel root faces 6.

Ridge lines of the respective external threads 3, 4 are formed to be sharp ridge lines or to be ridge lines respectively having a slight plane 11 (including a round face) as illustrated in the drawings.

Further, the slight arc face 7 is not formed at a connecting part of the upper flank 5 and the upper root face 6 at the constant-height external thread end flight 3a. Similarly, the slight arc face 7 is not formed at respective connecting parts of the upper and lower flanks 5 with the upper and lower root faces 6 of the rest of the constant-height external thread 3. That is, in either case, the flank 5 and the root face 6 respectively constituted with straight faces intersect obtusely. Here, there may be a case of connection with an arc face unavoidable in machining being smaller than the slight arc face 7 thereat.

Figure 2:
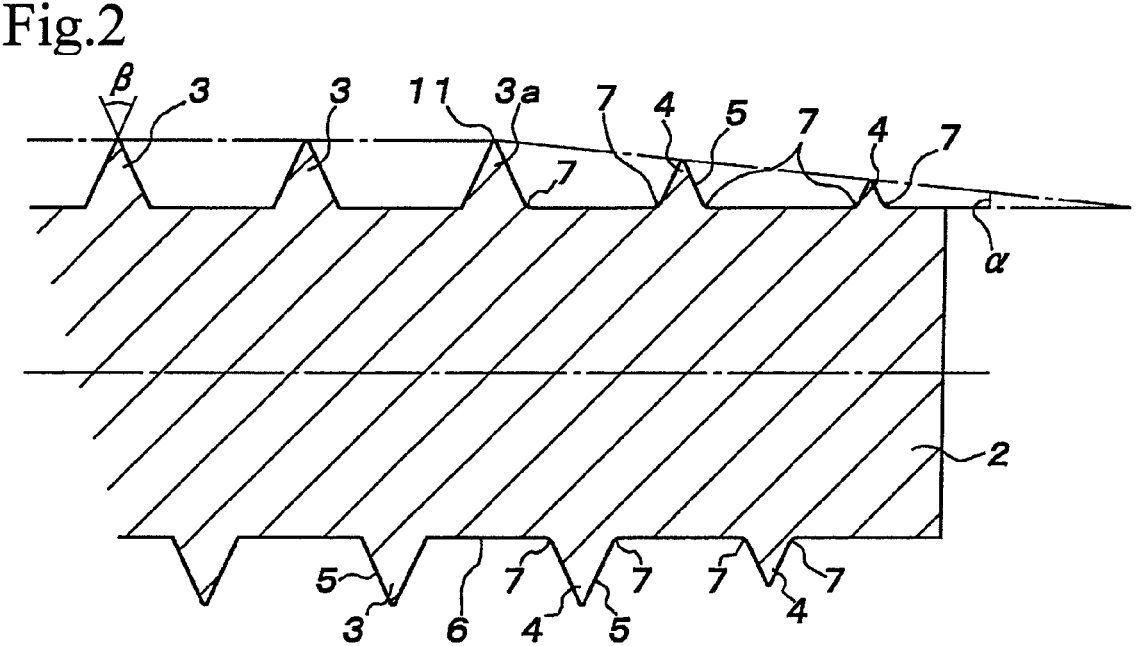
FIG. 2 is an enlarged sectional view of a screw shaft of the self-tapping screw.
Figure 3:
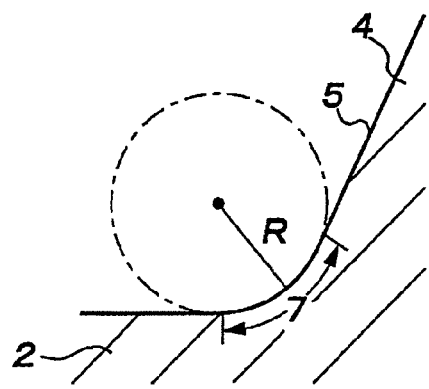
FIG. 3 is an enlarged sectional view of a slight arc face of the same.

Preferably, the curvature radius R of the slight arc face 7 in FIG. 3 of the low-height external thread 4 and the constant-height external thread end flight 3a is set to be in a range from 0.2 to 0.6 mm corresponding to the screw shaft diameter. In addition to the above configuration, the sectional shape of the constant-height external thread 3 is formed to be bilaterally symmetric and the thread angle β is set in a range from 48 to 52 degrees, as illustrated in FIG. 2.

According to the present invention, surface roughening and cracking at an external thread crest portion, such as occurs in the related art when rolling two step-shaped external thread, can be effectively prevented.

Figure 4:
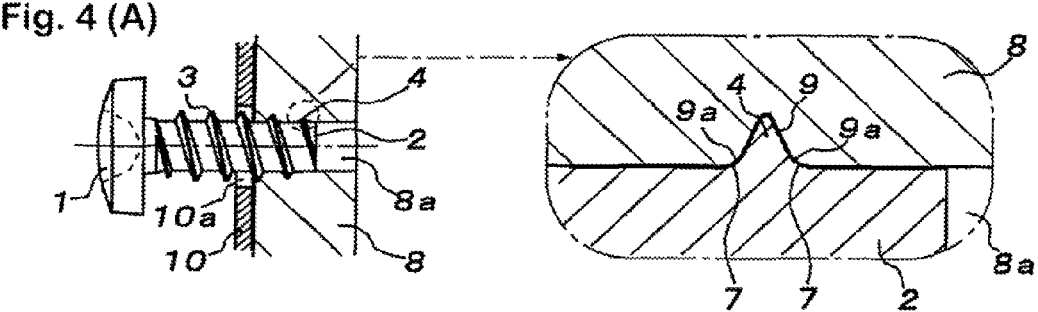
FIGS. 4A to 4D are explanatory views which sequentially illustrate screwing states of the self-tapping screw according to the present invention.
Figure 4:
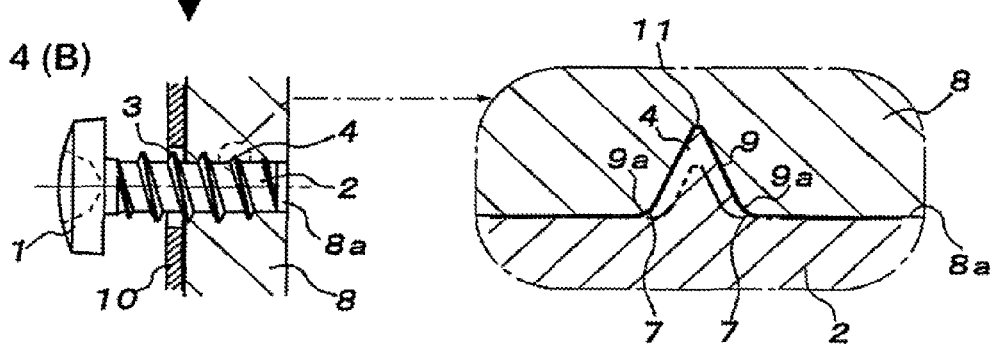
Figure 4:
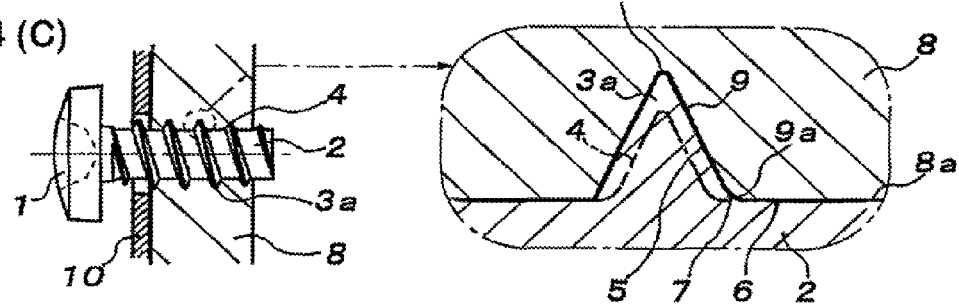
Figure 4:
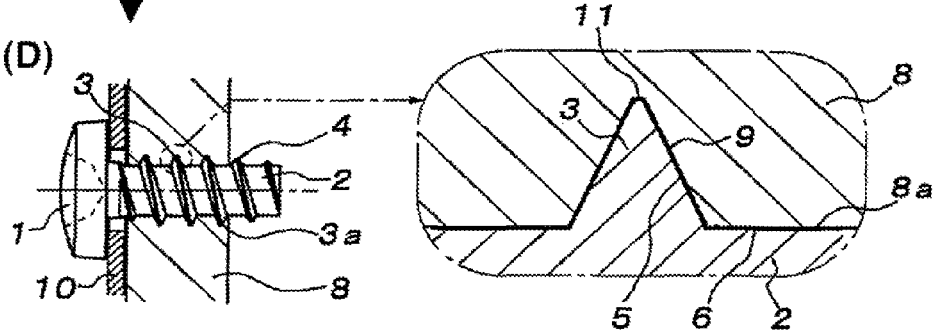

At the time of actual use, first, a counterpart 8 and an attaching part 10 are mutually overlapped while aligning a pilot hole 8a (i.e., a complete round hole having the same diameter as that of the screw shaft 2) of the counterpart 8 with an attaching hole 10a of the attaching part 10. Then, the shaft tip portion of the screw shaft 2 is to be screwed into the pilot hole 8a of the counterpart 8 from the attaching hole 10a side of the attaching part 10. At that time, as illustrated in FIGS. 4A and 4B, due to synergy between forming the low-height external thread 4 having the height thereof gradually decreased and forming the slight arc faces 7 at the low-height external thread 4 and the constant-height external thread end flight 3a, stress to the counterpart 8 at an initial stage of screwing can be relieved and an internal thread 9 can be formed smoothly. Accordingly, screwing torque at the initial stage can be reduced.

When the screw shaft 2 is further screwed, the constant-height external thread 3 is to be screwed in turn from the constant-height external thread end flight 3a side into the internal thread 9 formed by the low-height external thread 4 having the slight arc faces 7 formed. At that time, as illustrated in FIGS. 4C and 4D, due to slightly convexly curved faces 9a formed by the low-height external thread 4 having the slight arc faces 7 formed, material movement can be smoothly performed to corners of the flanks 5 and the root faces 6 of the succeeding constant-height external thread 3, so that the internal thread 9 can be formed in high accuracy. Accordingly, reliable engagement between the constant height external thread 3 and the internal thread 9 can be obtained and large fastening force can be obtained. Further, since the slight arc face 7 is formed along the constant-height external thread end flight 3a, transition from the low-height external thread 4 to the constant-height external thread 3 can be smoothly performed and stress applied to a counterpart at the transition part can be reduced.

Further, since it is possible to set breakdown torque to be large and the initial screwing torque to be small, the screwing torque range can be widened. Accordingly, it is possible to ensure a common torque band against counterparts made of resin or metal, so that screwing operation can be stably performed against any material.

Next, effectiveness of the self-tapping screw according to the present embodiment will be described in the light of confirmation test results.

Figure 5:
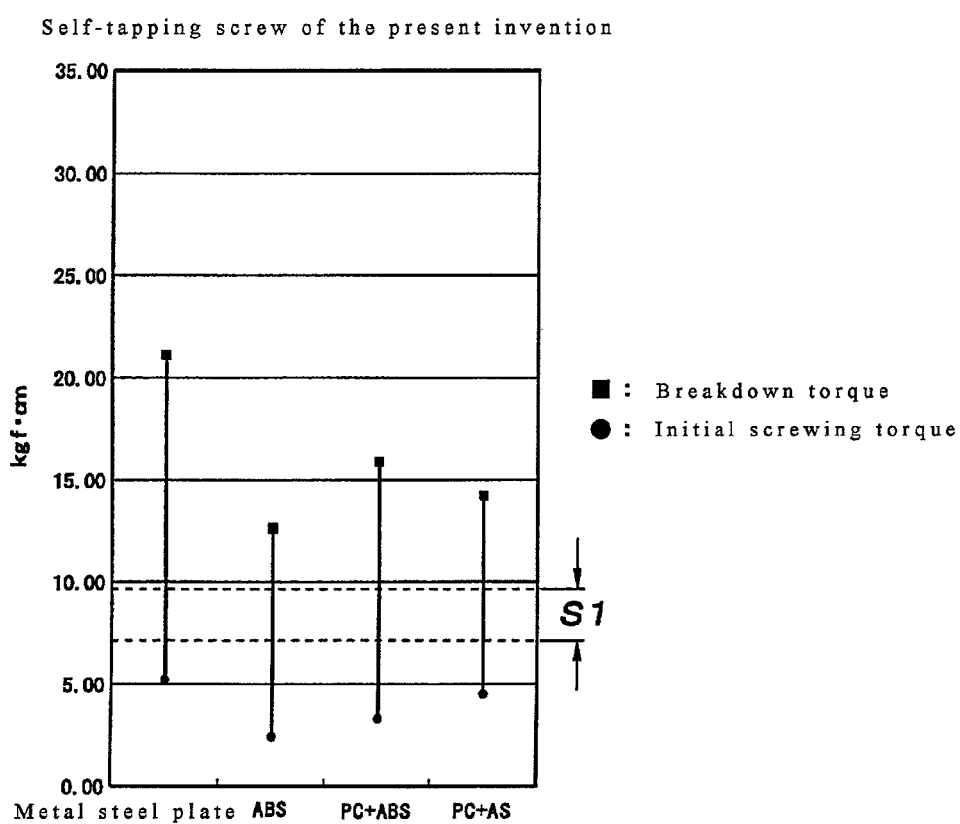
FIG. 5 is a graph which indicates initial screwing torque and breakdown torque of the self-tapping screw according to the present invention.
Figure 6:
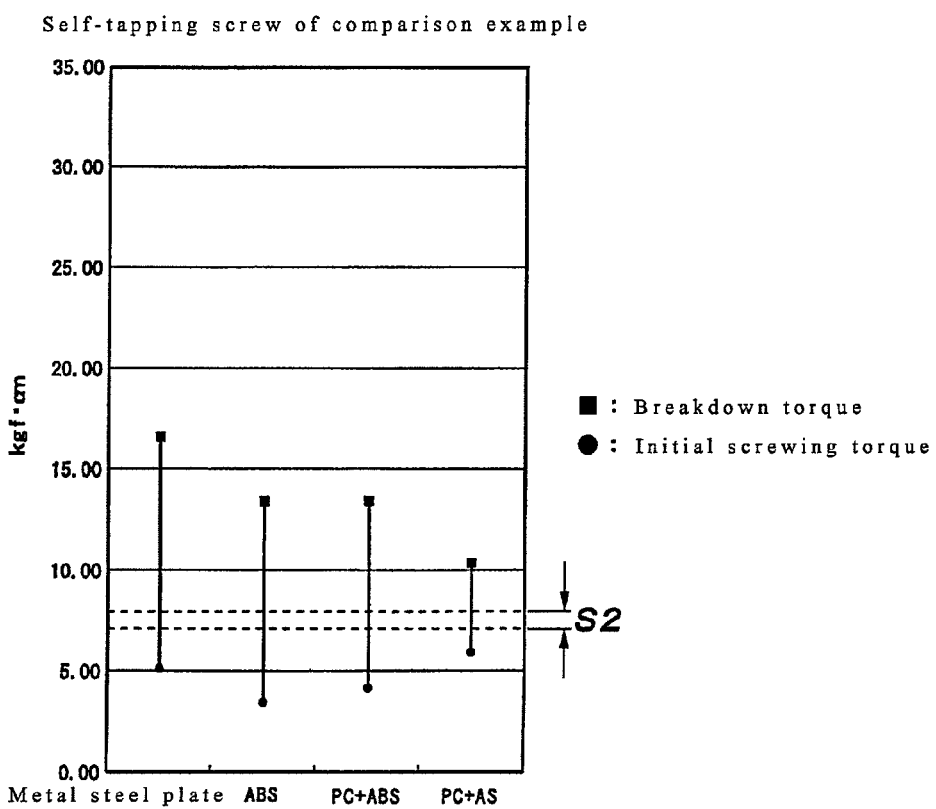
FIG. 6 is a graph which indicates initial screwing torque and breakdown torque of a self-tapping screw of a comparison example.

FIG. 5 indicates measurement results of initial screwing torque and breakdown torque of the self-tapping screw according to the present invention with four kinds of counterparts respectively made of different material (i.e., a metal steel plate, ABS resin material, polymerized material of polycarbonate and ABS resin, and polymerized material of polycarbonate and AS resin). FIG. 6 indicates measurement results of initial screwing torque and breakdown torque of a self-tapping screw of a comparison example without forming the low-height external thread 4 and the slight arc faces 7 of the present invention.

As is apparent from FIGS. 5 and 6, it can be confirmed that the initial screwing torque of the self-tapping screw according to the present invention is smaller than that of the self-tapping screw of the comparison example with the counterpart of every kind. Further, it can be confirmed that the breakdown torque of the self-tapping screw according to the present invention is larger than that of the self-tapping screw of the comparison example with the counterpart of every kind.

As is apparent from FIG. 5, with the self-tapping screw according to the present invention, since it is possible to enlarge the breakdown torque and to lessen the initial screwing torque as described above, the screwing torque range can be widened. Accordingly, the common torque band S1 can be sufficiently ensured against counterparts made of synthetic resin or metal, so that screwing operation can be stably performed against any material.

Meanwhile, as is apparent from FIG. 6, with the self-tapping screw according to the comparison example, since the range between the breakdown torque and the initial screwing torque is narrow as described above, the common torque band S2 cannot be sufficiently ensured against counterparts made of synthetic resin or metal, so that a dedicated screw must be used for each material.

With the self-tapping screw according to the present invention, large fastening force can be obtained while tapping an internal thread in high accuracy with small screwing torque. Therefore, it is preferable to be used to attach an attaching part such as a component to a counterpart made of synthetic resin or metal in electronic devices, communication devices, office equipment and the like.

What is claimed is:

1. A self-tapping screw comprising:
   a screw shaft formed of a cylindrical shaft that extends downward from a screw head and has a diameter that is constant over an entire length thereof;
   plural flights of constant-height external thread respectively having the same flight height formed at a part of the screw shaft extended right below the screw head; and
   plural flights of low-height external thread having flight height decreased gradually toward an end face of a shaft tip portion formed continuously with the constant-height external thread at the shaft tip portion of the screw shaft;
   wherein a slight arc face, having a curvature radius in a range of 0.2 to 0.6 mm, is formed continuously at respective connecting parts of upper and lower flanks with upper and lower root faces of the low-height external thread;
   wherein the slight arc face is formed so as to extend along a connecting part of a lower flank and a lower root face of a constant-height external thread end flight continuing to the low-height external thread;
   wherein the slight arc face is not formed at a connecting part of an upper flank and an upper rood face of the constant-height external thread end flight; and
   wherein the slight arc face is not formed at respective connecting parts of upper and lower flanks with upper and lower root faces of the flights of the constant height external thread other than the constant height external thread end flight.

2. The self-tapping screw according to claim 1, wherein the constant-height external thread continuing to the low-height external thread has a bilaterally symmetric shape in section with thread angle in a range from 48 to 52 degrees.

3. The self-tapping screw according to claim 2, wherein the low-height external thread is formed at the shaft tip portion having the constant diameter.

4. The self-tapping screw according to claim 1, wherein the low-height external thread is formed at the shaft tip portion having the constant diameter.

* * * * *